(12) United States Patent
Wagner

(10) Patent No.: US 8,885,014 B2
(45) Date of Patent: *Nov. 11, 2014

(54) APPEARANCE MATCHING FOR VIDEOCONFERENCING

(75) Inventor: Niv Wagner, Rechovot (IL)

(73) Assignee: Polycom, Inc., San Jose, CA (US)

( * ) Notice: Subject to any disclaimer, the term of this patent is extended or adjusted under 35 U.S.C. 154(b) by 297 days.

This patent is subject to a terminal disclaimer.

(21) Appl. No.: 13/372,074

(22) Filed: Feb. 13, 2012

(65) Prior Publication Data

US 2012/0147130 A1    Jun. 14, 2012

Related U.S. Application Data

(63) Continuation of application No. 11/684,271, filed on Mar. 9, 2007, now Pat. No. 8,144,186.

(51) Int. Cl.
*H04N 7/15* (2006.01)
*H04N 7/14* (2006.01)
*H04N 5/262* (2006.01)

(52) U.S. Cl.
CPC .............. *H04N 7/147* (2013.01); *H04N 7/152* (2013.01); *H04N 5/262* (2013.01)
USPC ..................... 348/14.09; 348/14.13

(58) Field of Classification Search
USPC ............................................ 348/14.01–14.16
See application file for complete search history.

(56) References Cited

U.S. PATENT DOCUMENTS

| | | | |
|---|---|---|---|
| 6,452,642 B1 * | 9/2002 | Brett | 348/578 |
| 6,680,745 B2 | 1/2004 | Center, Jr. et al. | |
| 7,221,385 B2 | 5/2007 | Hamada | |
| 7,565,680 B1 * | 7/2009 | Asmussen | 725/135 |
| 7,924,305 B2 | 4/2011 | Thielman et al. | |
| 7,924,306 B2 | 4/2011 | Thielman et al. | |
| 2002/0113862 A1 | 8/2002 | Center, Jr. et al. | |
| 2004/0135788 A1 * | 7/2004 | Davidson et al. | 345/530 |
| 2006/0082676 A1 | 4/2006 | Jenkins et al. | |
| 2006/0268101 A1 * | 11/2006 | He et al. | 348/14.12 |
| 2008/0043090 A1 * | 2/2008 | Wiener | 348/14.09 |

* cited by examiner

*Primary Examiner* — Melur Ramakrishnaiah
(74) *Attorney, Agent, or Firm* — Wong, Cabello, Lutsch, Rutherford & Brucculeri, L.L.P.

(57) ABSTRACT

Methods and systems for presenting video images generated by multiple endpoints in a videoconference such that the displayed images have consistent appearance, for example consistent brightness levels are disclosed. Sampling methods and algorithms are used to calculate an appropriate amount of correction for each video image and the images are adjusted accordingly. Brightness correction may implement one or more brightness sampling and analyzing logical modules (BSAM) and one or more transforming logical module (TLM). The brightness matching methods may be implemented in centralized architecture, for example, as part of a multipoint control unit (MCU). Alternatively, the methods may be implemented using a distributed architecture.

22 Claims, 7 Drawing Sheets

FIG. 5
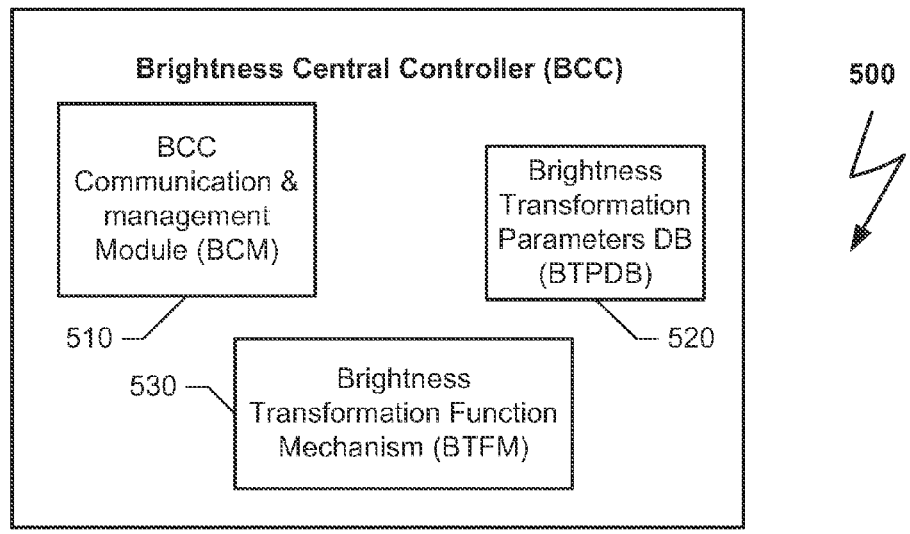
FIG. 6
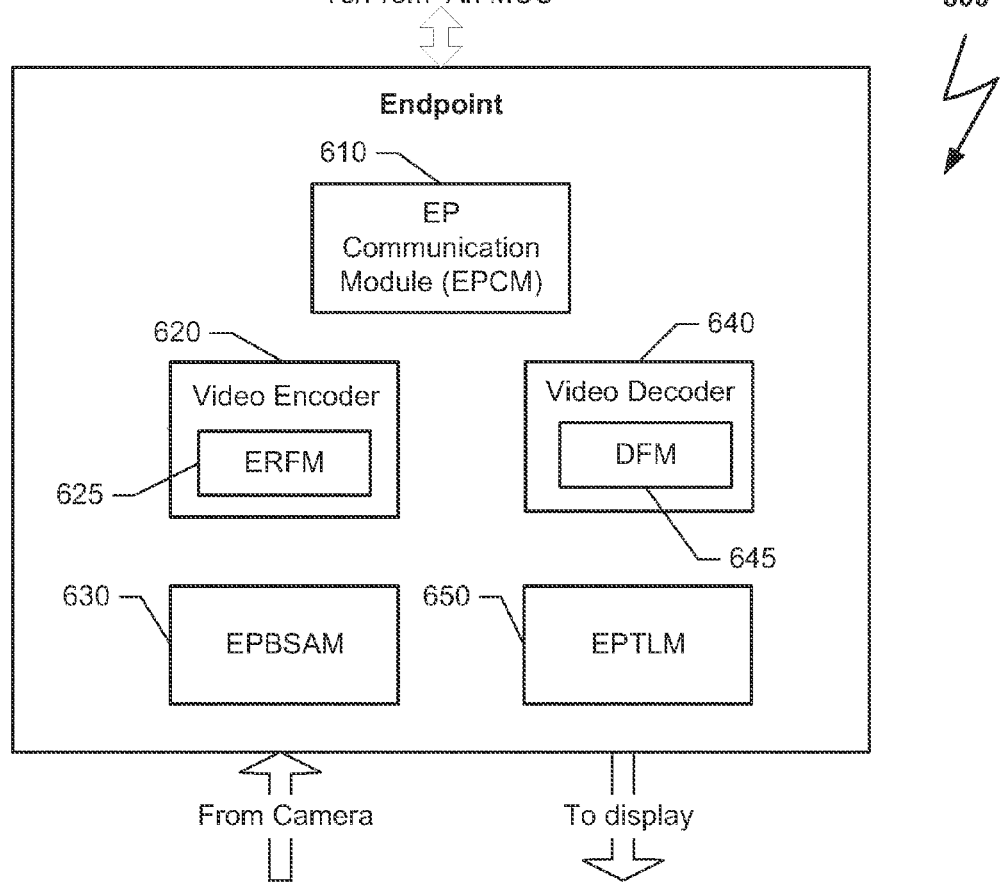

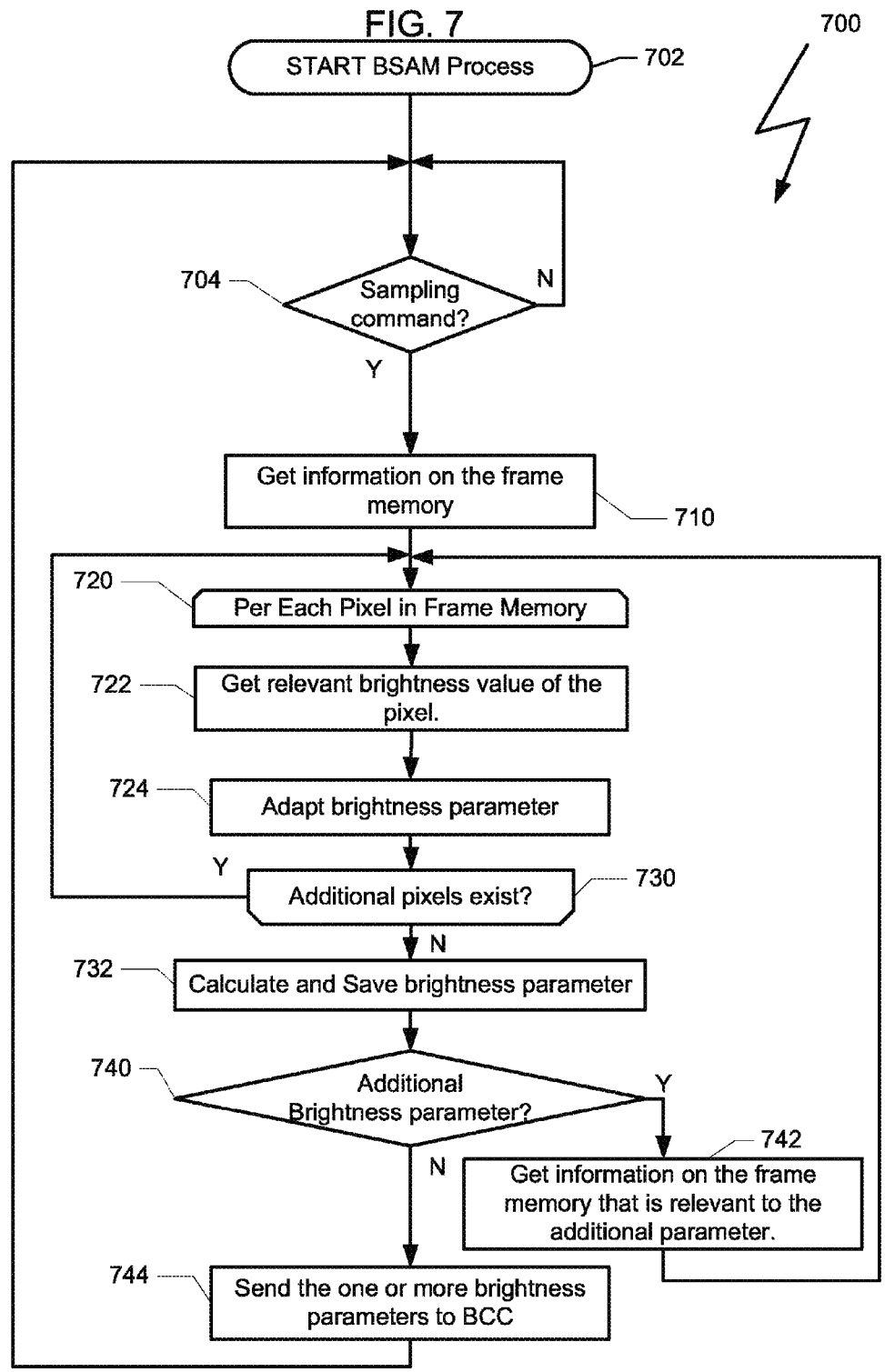

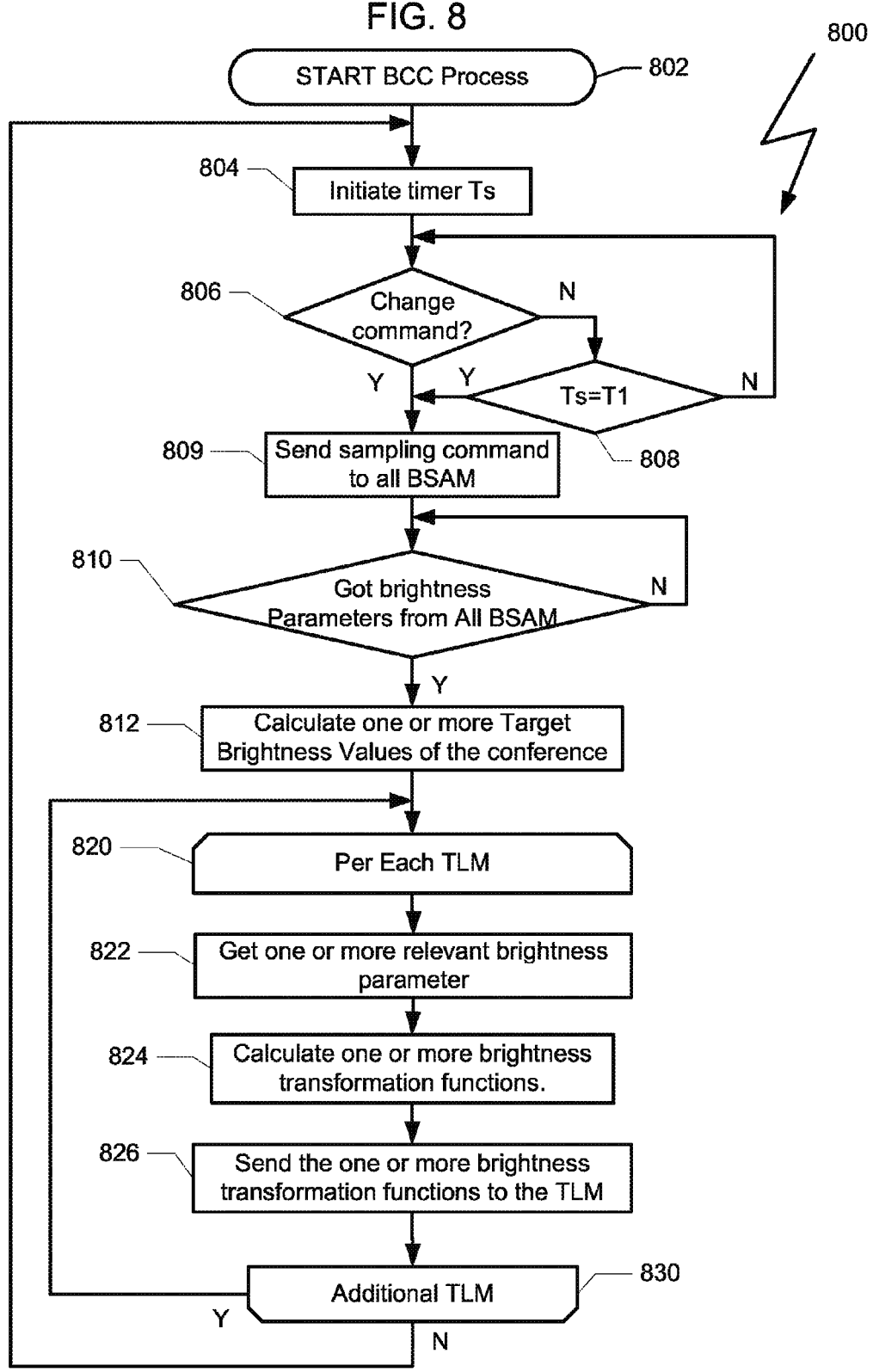

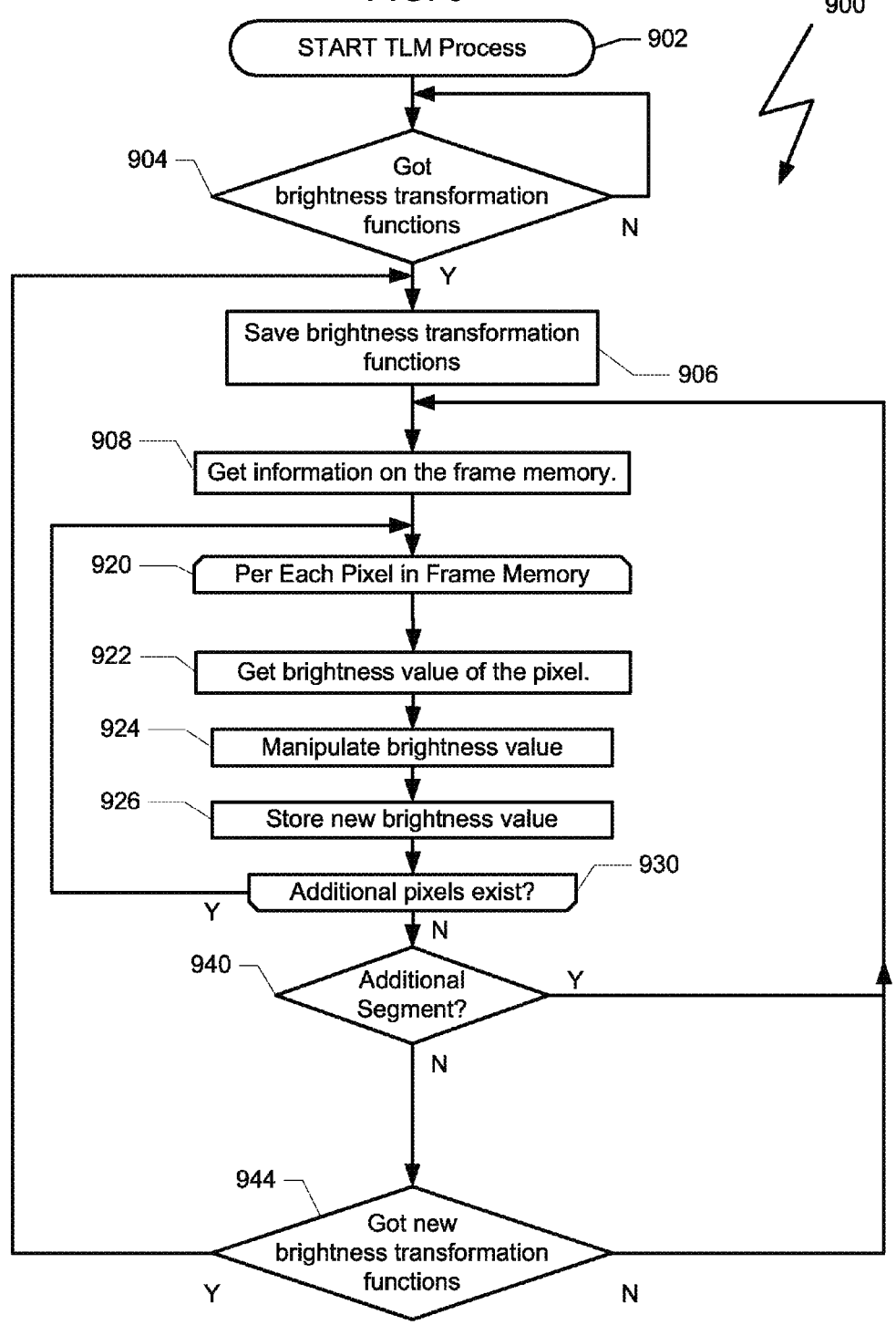

APPEARANCE MATCHING FOR VIDEOCONFERENCING

CROSS REFERENCE TO RELATED APPLICATIONS

This Application is a continuation of U.S. patent application Ser. No. 11/684,271 entitled "Appearance Matching for Videoconferencing" filed Mar. 9, 2007, which is incorporated by reference in its entirety herein.

TECHNICAL FIELD

The present disclosure relates to videoconferencing, and more specifically to multipoint videoconferencing. More specifically, methods and systems for presenting video images generated by multiple endpoints such that the displayed images have consistent brightness levels are disclosed.

BACKGROUND ART

Two common display modes for a multipoint video conference are video switching and continuous presence (CP) modes. A multipoint conference is a conference having three or more conferees. In a video switching mode, during a certain period, a conferee can see one other conferee, typically the participant who is the current speaker. The display on the endpoint of the current speaker may present the video image of the previous speaker, for example. In continues presence (CP) mode a conferee can see a composition of a plurality of video images, each located in a segment on the screen. Each segment may be the same size or the segments may have different sizes, for example, with the current speaker displayed in the biggest segment and the other conferees displayed in smaller segments. During the conference the displayed conferees may change frequently according to the dynamic of the conferencing session. Each image may appear different from the others. The appearance of the image can be affected by one or more parameters such as but not limited to brightness, color, sharpness, etc.

The conferees in a multipoint videoconference are typically located at different sites, each having a camera that may be adjusted and/or set up differently than the other sites. The sites may have different brightness conditions and the conferees may be located in environments of different brightness. As such, the video images of different conferees may have different brightness levels. These differences in brightness levels affect a user's experience. For example, in switching mode, a large difference in brightness between the video images of a current speaker compared to the previous speaker can be unpleasant for a user because the user requires more time to get used to the image of the each new current speaker. In a CP mode, large differences in the brightness between the endpoints cause difficulties in finding a display setting such that a user can easily see all of the displayed conferees. The user's vision may adapt to the brighter segments and such that the user may not see details in the darker segments of the display, for example.

Other example of when the brightness of a single image can be improved include situations wherein the brightness conditions and settings of a video camera may be imperfect, creating an image that is either too dark or too bright. These imperfect settings/conditions can degrade details in interesting zones of the image. An example is when a conferee is sitting in a dark area and the image also includes a bright area such as a window on a sunny day.

Accordingly, there is a need in the art for controlling appearance parameters such as the level of the brightness, color, sharpness, etc. of a plurality of video images during a video conference session. Such a method would improve the user's experience.

SUMMARY OF INVENTION

This disclosure provides systems and methods for controlling the brightness level of video images created at different endpoints during a multipoint video conference. Such brightness control improves the videoconferencing experience of a conferee. The disclosed systems and methods use sampling methods and algorithms to calculate an appropriate amount of correction for each video image and adjusting methods to implement the corrections in various man machine interfaces (MMI) with conferees and/or endpoints. Brightness matching can be implemented by a multipoint control unit (MCU) that handles the multipoint video conference. The MCU receives the video images from the plurality of conferee's endpoints and delivers video switching images and/or CP video images to the different conferees.

Brightness correction may implement one or more brightness sampling and analyzing logical modules (BSAM) and one or more transforming logical module (TLM). Different algorithms can be used by embodiments of the BSAM. The BSAM may calculate an average brightness value for each conferee's video image for composing a CP image. Alternatively, the BSAM may compose a brightness histogram for each conferee's video image.

Decoded video data of each of the video images of conferees participating in the session can be sampled. The sampling can be done by monitoring a decoded video component associated with the brightness. For example, for decoded video expressed in YUV components, wherein Y represent luminance and U and V represent color, the Y component can be sampled and controlled. Because the brightness of a video image during a video conference may change slowly, the sampling can be done periodically, once in few minutes, for example. Alternatively, the sampling can be implemented after a change in the layout and/or a change in the presented conferees.

The calculation of the average brightness or a histogram of brightness of a video image can be implemented on an entire frame. Alternatively, a segmentation method may be used, in which a frame can be divided into two or more segments (two half frames, four quarter frames, etc.). In such an embodiment an average brightness value or a histogram of brightness can be calculate per each segment. Still alternatively, a combination of the two, i.e., a single average value or a histogram of brightness can be used more frequently and from time to time the segmentation method may be implemented.

The TLM may use one or more of a variety of algorithms. In some embodiments the TLM may add a certain value (i.e., an offset) for each image to the brightness level (luminance) of each pixel in order to change the average level of the brightness of each conferee's video image that composes the CP image. A clipper at both ends of the brightness range can be added. Alternatively, the TLM may add different brightness values to each segment of a brightness histogram to match the brightness histograms of the different conferee's video images that compose the CP image. Alternatively, instead of adding certain values, the TLM may implement a brightness transformation. The transformation can be linear transformation. In some embodiments the brightness transformation can be implemented by using a look-up table (LUT) that converts the Y value of pixels with stored values.

In other exemplary embodiments a LUT having two or more dimensions can be used to adjust two or more components of a video image. Each dimension can be represented by a group of address bits and a group of data bits. Each group of data bits represents the new values of a component of the video image. In some embodiments a multi-dimensional LUT can transfer the video image data from one space of colors to another space of colors. A TLM having multi-dimensional LUT can be used in embodiment wherein a color parameter is adjusted.

Various architectures can be implemented to achieve the results described herein. In one embodiment a centralized architecture can be used. In a centralized architecture the brightness controlling process can be implemented at an MCU conducting the videoconferencing session. An exemplary video unit of an MCU may contain a plurality of input modules, a common interface, and a plurality of output modules. Each input module may be associated with a different conferee's endpoint. The input module can be adapted to receive a compressed video image created and delivered by its associated endpoint, decode the compressed video, scale the decoded image, and send the scaled decoded video data to a common interface. Depending on the mode of the conference, each output module can receive from the common interface one or more decoded video data delivered by input modules associated with selected conferees. The output module can build a composed image from the plurality of decoded streams or may switch between the different input modules. Common functionality of the various components of a video unit is known in the art and is not described in exhaustive detail herein. For further description, reference is made to U.S. patent application Ser. No. 10/144,561; U.S. Pat. No. 6,300,973; and International Application Serial No. PCT/IL01/00757, the contents of which are incorporated herein by reference.

In an exemplary centralized architecture each input module may include a BSAM. The BSAM may sample the brightness component of each pixel in the decoder frame memory before the decoded data is sent to the common interface and calculate one or more appearance parameters of the video image associated with the input module. A frame memory module is a memory that stores video data associated with one or more video frames. A frame memory module may employ two or more frame memories (a current displayed frame memory and a next frame memory, for example). The memories may alternately store and alternately output video data of consecutive frames. Each address of a frame memory is associated with a pixel or a group of pixels on the screen.

Appearance parameters can include level of brightness, hue, sharpness, etc. In the present disclosure the brightness parameter is selected as a representative appearance parameter. The brightness parameters can be an average value of the entire frame; average values of two or more segments; a brightness histogram, etc. Each average value can be associated with a deviation parameter such as Sum of Absolute Difference (SAD). According to one embodiment, the brightness parameters of each input module can be sent to a brightness central controller (BCC).

The BCC may receive the brightness parameters from each of the input modules involved in the videoconference. Based on the brightness parameters of the video inputs, the BCC may calculate a set of one or more Target Brightness Values for the conference and a set of one or more brightness transformation functions to be implemented on each of the decoded video streams to match the brightness perception of the different images composing the video images of the conference. A set of target brightness values may have a single value, for example in an embodiment in which the brightness parameter is the average of the brightness value of each pixel in the frame. In other exemplary embodiments a plurality of target values can be used, for example if a frame is divided into a plurality of zones (segments). In such embodiments a set of a plurality of target brightness values may be used such as a target value for each segment, etc. Similarly, a set of one or more brightness transformation functions can be used. The brightness transformation functions can be delivered to the relevant one or more TLMs. Each TLM may manipulate the level of the brightness component of each pixel in a decoded frame memory according to the brightness transformation functions.

In another exemplary centralized architecture each input module may also include a TLM. The TLM can be used to manipulate the level of the brightness of the decoded video data delivered by the input module. According to such embodiments the decoded video streams sent to the common interface from the input modules are brightness manipulated and have similar brightness characteristics. In an alternative centralized architecture, each output module may include a TLM. According to such embodiments the TLM uses the set of brightness transformation functions for each input image to manipulate the brightness value of each pixel belonging to the relevant input images in the frame memory of the composed video image before encoding the composed image.

Still alternatively, a centralized BCC module may not be used. In such embodiments the brightness parameters of each input module can be associated with the decoded video stream and sent to the common interface. Each output module may implement the functionality of the BCC on images selected by the output module. Such an output module may retrieve the brightness parameters while retrieving the decoded stream and calculate a set of one or more brightness transformation functions required per each decoded input stream composing the video image of the output module. Then the TLM associated with the output module may manipulate the brightness of each decoded stream according to the set of brightness transformation functions relevant to the decoded stream.

Other exemplary embodiments may use distributed architecture. In a distributed configuration the task of matching the brightness of video images coming from different endpoints are implemented in cooperation between the endpoints and the MCU. For example, each endpoint may include a BSAM that samples and analyzes the brightness of the video image of the endpoint before encoding it. The calculated brightness parameters of the BSAM may be sent by the endpoint to a BCC that is part of the MCU. The brightness parameters can be sent out of band using an Internet Protocol (IP) connection between the MCU and the endpoint, or over a signaling connection for example, or can be sent in-band in association with a video stream. For example, using compression standard H.264, a Supplementary Enhanced Information (SEI) packet can be used. The SEI packet attached to each frame can carry brightness related information and control. Using H.263 as the compression standard, one or more Picture Supplemental Enhancement Information (PSUPP) fields in the frame header can be modified to carry the brightness parameters. According to some embodiments the brightness parameters can be embedded within a Real-time Transport Protocol (RTP) packet as a part of a predefined header of the payload of a video packet.

A BCC at the MCU may get brightness parameters from the endpoints and calculate a set of one or more brightness transformation functions that can be used for manipulating each of the video images. In one exemplary embodiment of a distributed architecture each endpoint may have a TLM in front of the encoder of the endpoint. In such an embodiment the BCC at the MCU may send the set of one or more brightness transformation functions to the TLM of the relevant endpoint. The TLM may manipulate the brightness component of the video image according to brightness transformation functions. The transformed brightness image is transferred to the encoder to be compressed. In such embodiments the received compressed video streams from the endpoints have similar perceptual brightness at the input of the MCU.

According to another exemplary distributed architecture an MCU may perform the brightness transformation. In such an embodiment each input module in the MCU may have a TLM at the output of the decoder. The TLM may transform the brightness component of each decoded stream before sending it to the common interface. In an alternative configuration each output module can have a TLM in front of the encoder. Still alternatively, a combination of these architectures may be used depending on the specific needs of the conference. For example in one conference a first group of the endpoints may have the capabilities to execute tasks of BSAM and/or TLM modules and a second group of endpoints may not have such capabilities. In such a conference session a mixed architecture can be used, i.e., a distributed architecture can be used with the first group of endpoints and the centralized architecture can be used with the second group of endpoints.

BRIEF DESCRIPTION OF DRAWINGS

The disclosure will be more readily understood from reading the following description and by reference to the accompanying drawings, in which:

FIG. 5 is a block diagram illustrating elements of an exemplary Brightness Central Controller (BCC);

FIG. 6 is a block diagram illustrating elements of an exemplary Endpoint;

FIG. 7 is a flowchart showing steps of an exemplary process of an exemplary BSAM;

FIG. 8 is a flowchart showing steps of an exemplary process of an exemplary BCC; and FIG. 9 is a flowchart showing steps of an exemplary process of an exemplary TLM.

DESCRIPTION OF EMBODIMENTS

An endpoint is a terminal on a network, capable of providing real-time, two-way audio/visual/data communication with other terminals or a multipoint control unit (MCU). An endpoint may provide speech only; speech and video; or speech, data and video communications, etc. Exemplary endpoints include Polycom VSX series HDX series, etc. (Polycom, Inc.). An MCU is a conference controlling entity located in a node of a network or in a terminal, which receives and processes several media channels from access ports according to certain criteria and distributes them to the connected channels. Examples of MCUs include the MGC-100, (Polycom Inc.). MCUs can be composed of two logical units—a media controller (MC) and a media processor (MP). A more thorough definition of an endpoint (terminal) and an MCU can be found in the International Telecommunication Union ("ITU") standards, such as but not limited to the H.320, H.324, and H.323 standards. Additional information regarding the ITU standards can be found at the ITU website.

Turning now to the figures (in which like numerals represent like elements throughout the several views), exemplary embodiments, aspects, and features of the disclosed methods, systems, and apparatuses are described. For convenience, only some elements of the same group may be labeled with numerals. The purpose of the drawings is to describe exemplary embodiments and not for limitation.

Figure 1:
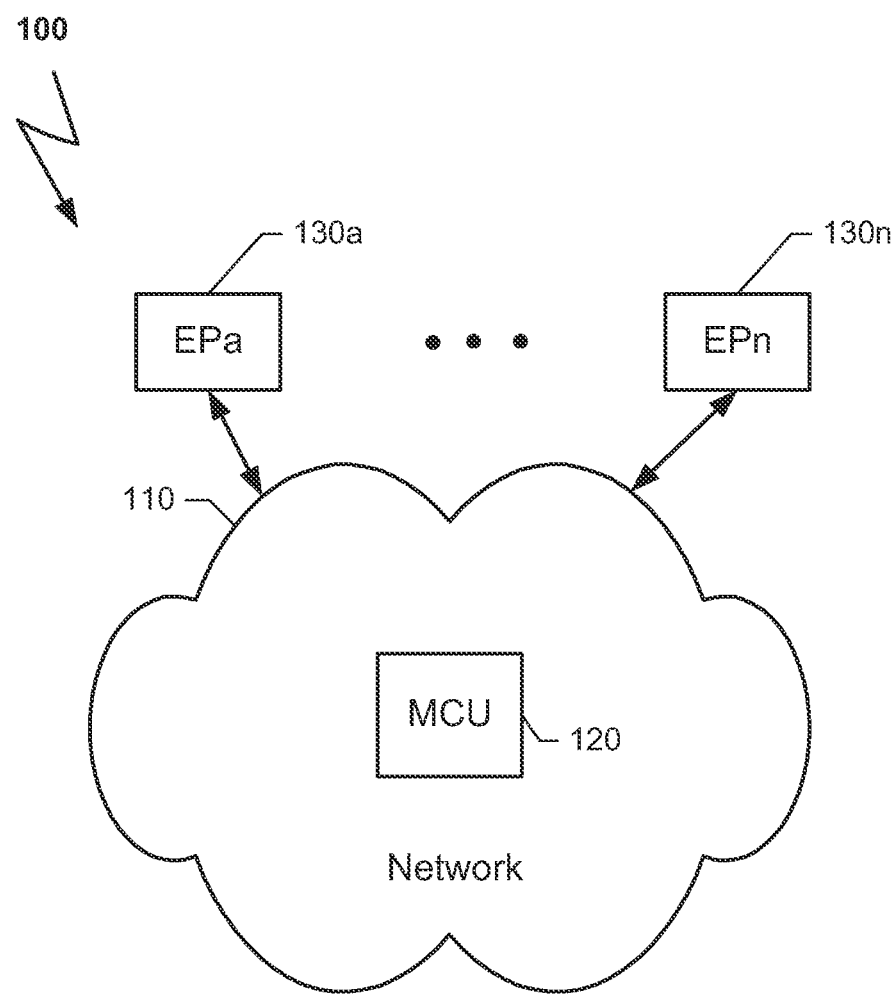
FIG. 1 illustrates a multimedia multipoint conferencing system.

FIG. 1 is a block diagram illustrating an exemplary multimedia multipoint conferencing system 100. System 100 can include a network 110, one or more multipoint control units (MCU) 120, and a plurality of endpoint 130a-n. Network 110 can be a packet switched network, a circuit switched network, or any combination of the two. The multimedia communication over the network can be based on communication protocol such as but not limited to H.320, H.324, H.323, SIP, etc.

MCU 120 and endpoints 130a-n can be adapted to operate according to the disclosed embodiments to improve a user's perception while viewing a display or an image of a multipoint video conferencing endpoint. In the described examples, a brightness parameter is chosen as an exemplary appearance parameter. Other embodiments may use one or more other appearance parameters such as hue, sharpness, etc. Some disclosed embodiments relate to a centralized architecture in which MCU 120 is adapted to perform brightness control methods. Alternatively, distributed architectures can be used wherein endpoints 130a-n as well as MCU 120 are adapted to perform the disclosed brightness controlling methods. More information about the operation of MCU 120 and endpoints 130a-n are disclosed below in conjunction with FIG. 2-FIG. 9.

Figure 2:
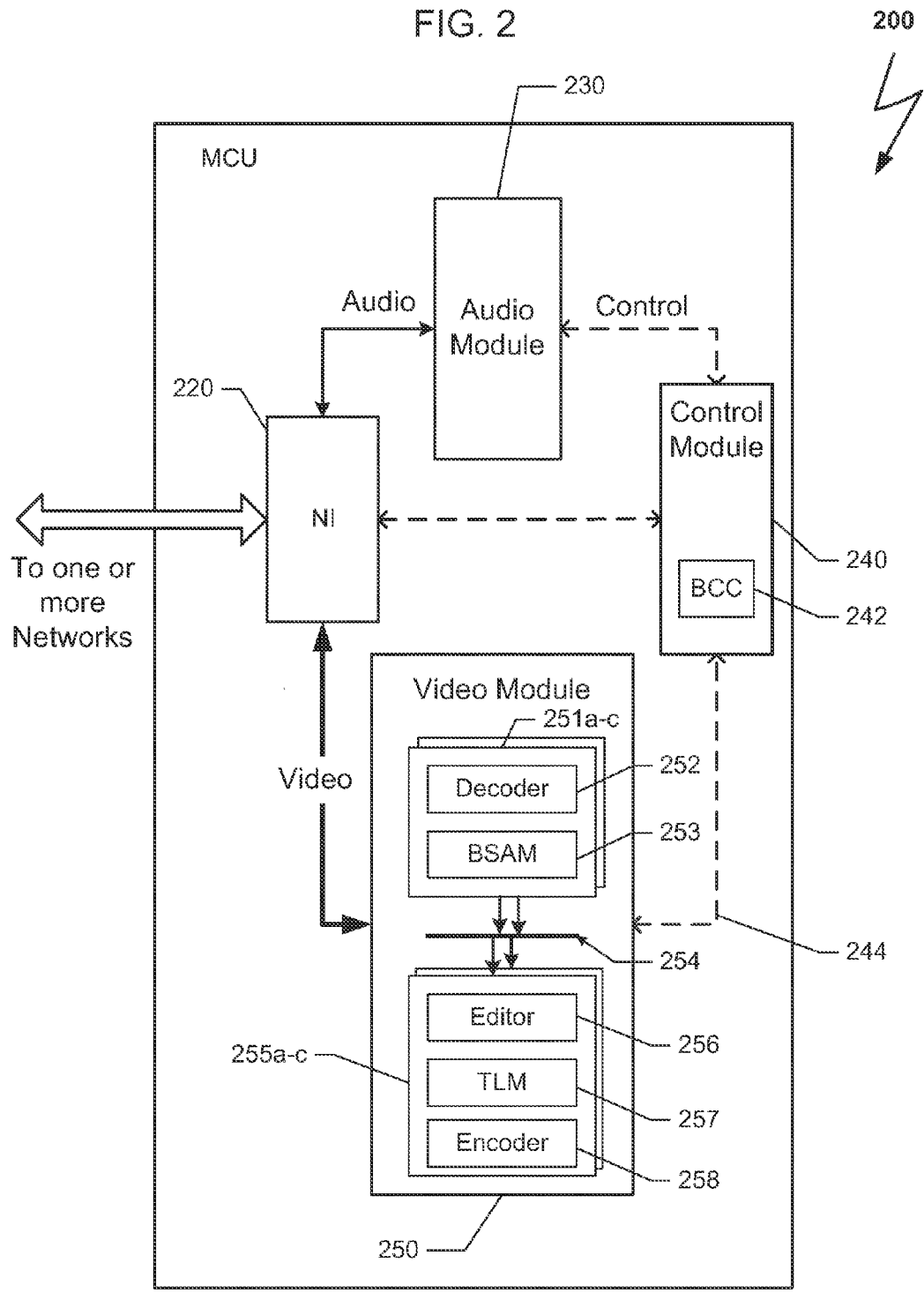
FIG. 2 is a block diagram illustrating elements of an exemplary MCU.

FIG. 2 illustrates elements of an exemplary MCU 200, which is capable of implementing aspects of the disclosure. MCU 200 may include a network interface module 220, an audio module 230, a control module 240, and a video module 250. The network interface module 220 receives communication from a plurality of endpoints 130a-n (FIG. 1) via networks 110 (FIG. 1). Network interface 220 processes the communication according to one or more variety of communication standards such as but not limited to H.320, H.323, SIP, etc. and compression standards such as H.261, H.263, H.264, etc. Network interface 220 can receive and transmit control and data information to/from other MCUs and endpoints. More information concerning the communication between the endpoint and the MCU over network 110 and information describing signaling, control, compression, and setting a video call can be found in the international telecommunication union (ITU) standards H.320, H.321, H.323, H.261, H.263 and H.264.

Network interface module 220 multiplexes/demultiplexes the different signals communicated between the endpoints and the MCU. The compressed audio signal is transferred to and from the audio module 230. The compressed video signal is transferred to and from video module 250 and the control and signaling is transferred to and from control module 240. Furthermore, in an exemplary embodiment in which distributed architecture is used, network interface module 220 can be capable of handling brightness control information transferred between the endpoints 130a-n FIG. 1 and the control module 240. In one exemplary embodiment in which the brightness control information is sent in the RTP packet as a part of a predefined header of the payload, NI 220 can be adapted to process the predefined header of the RTP in order to read or add brightness control information to the RTP packet.

Audio module 230 may receive via the audio line compressed audio streams from the endpoints via network interface 220. The audio module 230 decodes the compressed audio streams, analyzes the decoded streams, selects certain streams, and mixes the selected streams. Then the mixed stream is compressed and the compressed audio stream is sent via the audio line back to network interface 220, which sends the compressed audio streams to the different endpoints. Audio streams that are sent to different endpoints can be different. For example the audio stream can be formatted according to the different communication standard and according to the needs of the individual endpoint. Also audio streams may not include the voice of the user associated with the endpoint to which the audio stream is sent even though that voice is included in all other audio streams. Audio module 230 can be adapted to analyze the received audio signals from the endpoints and determine the audio signal energy of each endpoint. Information on the signal energy can be transferred to the control module 240. The energy level can be used to determine which endpoint is the "selected endpoint" or "presented endpoint," i.e., which endpoint is the speaking endpoint.

Control module 240 can be a logical unit that controls the operation of the MCU 200. In addition to common operation of a typical MCU, MCU 200 is capable of additional functionality as result of having control module 240. Control module 240 includes an exemplary brightness central controller (BCC) 242. The BCC 242 can be capable of receiving a plurality of brightness parameters. Each brightness parameter reflects the brightness of the image sent by an endpoint. For each multimedia conference the BCC 242 is capable of calculating a target of brightness parameter. The target brightness parameter of each conference reflects the desired brightness that each endpoint has to deliver to the MCU in order to create a pleasant display in which each video image has similar brightness. Based on the target brightness value and the brightness parameter of each image, the BCC 242 can be adapted to calculate a set of one or more brightness transformation functions per each received video image. The set of one or more brightness transformation functions is a function or a group of functions that can be implemented or executed on the brightness values of each of the pixels of the video image to generate a video image having a brightness perception that matches the other video images. More information on the operation of BCC 242 is disclosed below in conjunction with FIG. 5 and FIG. 8.

Video module 250 receives compressed video streams for the plurality of endpoints 130a-n (FIG. 1) that are sent toward the MCU 200 via network 110 (FIG. 1) and processed by network interface 220. Video module 250 can create one or more compressed CP video images according to one or more layouts that are associated with one or more conferences currently being conducted by the MCU 200. An exemplary video module 250 can have a plurality of input modules 251a-c, a plurality of output modules 255a-c and a video common interface 254. Each input module 251a-c can be associated with one endpoint. Each output module 255a-c can be associated with one or more endpoints.

Exemplary input module 251a-c includes (among other elements) a decoder 252 and a brightness sampling & analyzing module (BSAM) 253. The decoder 252 receives compressed video sent from an endpoint associated with the relevant input module 251 and decodes the compressed video into decoded video data. Usually the decoded video data is constructed from three components, referred to as YUV. The Y component reflects the brightness and the U and V components reflect the chrominance of the pixel, for example. The decoded information is stored in a decoder frame memory. The data of the decoder frame memory can be sampled by BSAM 253. BSAM 253 is adapted to sample the brightness component of each of the pixels in the decoder frame memory. The BSAM may calculate statistical information (brightness parameters) reflecting the brightness of the received video image. An exemplary statistical parameter can be the average brightness value of the image and its associated SAD information (sum of absolute difference from the average). Alternatively, BSAM may calculate a brightness histogram of the received decoded video image. Yet alternatively, BSAM can be adapted to divide the pixels of the frame memory into segments and calculate the brightness parameters of each segment. The one or more brightness parameters can be transferred to BCC 242 in the control module 240 and used for calculating the target brightness value of the conference as well as one or more brightness transformation functions required to manipulate the brightness of the received video images. More information about the operation of BSAM 253 is disclosed below in conjunction with FIG. 3 and FIG. 7.

Referring now to the output module 255a-c, an exemplary output module 255 may include an editor 256, a transforming logical module (TLM) 257 and an encoder 258. Editor 256 is capable of grabbing decoded data of relevant video images from the common interface 244 to be composed into a CP image created by the output module 255. The editor 256 may scale and place the video data of each selected conferee into an editor frame memory according to the location of the image in the layout associated with the composed video of the CP image. In some embodiments the editor can add text, icon(s), borders, etc. over the CP image.

When the editor frame memory is ready with the selected conferee's images, transforming logical module TLM 257 may start manipulating the level of the brightness component. An exemplary TLM 257 may scan the brightness component section of the ready frame memory, the Y component for example. For each pixel a decision is made according to the layout of which video image it belongs. Based on this decision, relevant brightness transformation functions received from BCC 242 and be stored at TLM 257 are retrieved. The brightness value can then be manipulated according to the transformation parameters. The manipulated value can be stored in the same address of the editor frame memory. TLM 257 may proceed to the next pixel and repeat this process with all the pixels in the editor frame memory. The data in the frame memory is then ready to be encoded by encoder 258. More information about the operation TLM 257 is disclosed below in conjunction with FIG. 4 and FIG. 9.

The architecture illustrated in FIG. 2 is a centralized architecture in which the MCU 200 includes the BCC 242, a plurality of BSAMs 253, each being associated with an input module 251a-c, and a plurality TLMs (transformer logical modules) 257, wherein each TLM is associated with an output module 255a-c. Other exemplary embodiments may use other types of centralized architectures of an MCU. For example, TLM 257 could be located in each input module 251a-c between the BSAM 253 and the common interface 254 rather than being located at each output module 255a-c. In such a centralized architecture, the TLM 257 may process the brightness level of the decoded video signal delivered by the input module such that when the processed video signal is placed on the common interface its brightness level matches the brightness of the entire conference.

Another exemplary centralized architecture is one in which the BSAM module 253 is located between the editor module 256 and TLM 257. In such an embodiment the brightness value may be calculated over the composed image according to the location of each one of the composed decoded video images of the selected conferees.

Alternatively, in a decentralized architecture, the BSAM 253 can be located at each endpoint and the MCU may have only the BCC 242 and the TLM 257. In yet another decentralized architecture, BSAM 253 as well TLM 257 may be located at the endpoint and the MCU may have only BCC 242 at the control module 240.

Common functionality of various elements of video module 250 is known in the art and is not described in executive details herein. Video modules are described in U.S. patent application Ser. No. 10/144,561 and U.S. Pat. No. 6,300,973, the entire contents of which are incorporate herein by reference.

Figure 3:
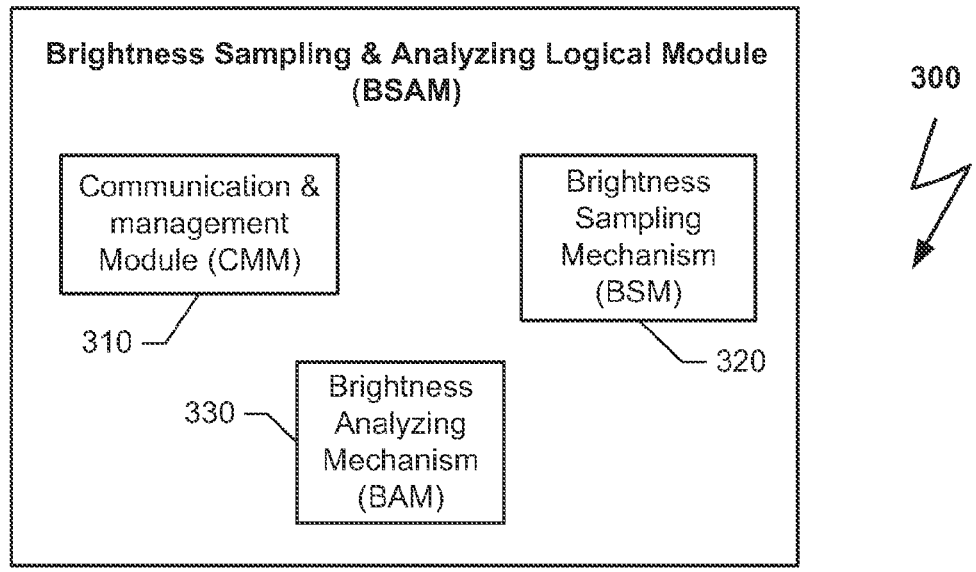
FIG. 3 is a block diagram illustrating elements of an exemplary brightness sampling and analyzing logical module (BSAM)

FIG. 3 is a block diagram illustrating elements of an exemplary brightness sampling and analyzing logical module (BSAM) 300. BSAM 300 is capable of sampling the brightness values of pixels of a video image created by an endpoint. In addition to sampling the brightness value, BSAM is capable of calculating a set of one or more brightness parameters, which reflect the brightness of the image video which is monitored.

In some exemplary embodiments, BSAM 300 can be located at the MCU in each of the video input modules 251 as illustrated in FIG. 2, for example. Such a BSAM 300 may be capable of reading the decoder frame memory of the input module. In other embodiments BSAM 300 can be located in each of the video output modules 255*a-c* (FIG. 2) and is capable of reading the editor 256 (FIG. 2) frame memory before the TLM 257 and the encoder 258. Such a BSAM 300 is adapted to read the brightness value of each of the pixels of the composed image before the brightness values are manipulated by TLM 257 and the decoded composed video data is encoded by the encoder 258. An alternative embodiment is a distributed architecture wherein BSAM 300 can be located at the endpoint associated with the encoder. Such a BSAM can read the encoder reference image.

An exemplary BSAM 300 can include a communication and management module (CMM) 310, a brightness sampling mechanism (BSM) 320, and a brightness analyzing mechanism (BAM) 330. CMM 310 can be used for communicating with BCC 242 (FIG. 2). In the downlink direction CMM 310 may receive command from BCC 242 to start sampling and analyzing a current video frame and in the uplink direction, toward BCC 242, CMM 310 sends a set of one or more brightness parameters, which are the results of the brightness analyzing made by BAM 330.

The communication between BSAM 300 and BCC 242 (FIG. 2) depends on the architecture used. For example in the case that the architecture is centralized, BSAM and BCC are located in an MCU 200 (FIG. 2), for example. The communication between CMM 310 and BCC 242 can be implemented over a control bus that connects the control module 240 with a video module 250 (FIG. 2). Alternatively in a distributed architecture BSAM 300 is located at the endpoint 130*a-c* while BCC 242 is located at the MCU 120 (FIG. 1). In such embodiment the communication can be implemented out of band or in band. In sessions in which the compression standard is H.263, one or more pictures supplement enhanced information (PSUPP) fields in the frame header can be modified to carry the sampling command in the downlink direction and the brightness parameters in the uplink direction toward the MCU. For example, using compression standard H.264, a Supplementary Enhanced Information (SEI) packet can be used. The SEI packet attached to each frame can carry brightness related information and control.

In other exemplary videoconference sessions in which the multimedia communication is over a package switched network, the communication between CMM 310 and BCC 242 can be implemented by using the predefined header of the payload of the RTP video packet. In such embodiment, the brightness parameters as well as the sampling command can be embedded within predefined header of the RTP video packet.

If communication between BSAM 300 and BCC 242 is conducted in band, the network interface 220 (FIG. 2) can be adapted to parse the received information and to retrieve the brightness parameters received from CMM 310 and deliver the brightness parameter to BCC 242 over the control bus connecting the control module 240 and network interface 220. In the other direction the network interface is adapted to receive sampling command and add it or MUX the information into a RTP packet as a part of a predefined header of the payload for example, depending on the embodiment.

An exemplary BSM 320 can be capable of sampling the brightness values of the next video image. In one exemplary embodiment in which BSAM 300 is located at the video input module of the MCU, BSM 320 is adapted to retrieve the brightness parameter of a ready frame memory of the decoder before transferring the decoded data to common interface 254 (FIG. 2). In another exemplary embodiment in which BSAM 300 is located at the endpoint, BSM 320 is adapted to retrieve the brightness parameter from a reference image memory of the encoder of the endpoint.

BSM 320 can retrieve a pointer to the frame memory that indicates the location of the brightness component Y. In exemplary embodiments wherein the frame is divided into two or more zones (segments) and a set of one or more brightness parameters is calculated for each zone, then BSM 320 is adapted to calculate the addresses in the frame memory for each zone to retrieve the brightness component of each pixel in each zone separately. Upon receiving a sampling command from BCC 242 (FIG. 2) via CMM 310, BSM 320 starts the sampling process and retrieves the brightness component of each pixel. The brightness component is transferred to brightness analyzing mechanism (BAM) for further processing.

An exemplary Brightness Analyzing Mechanism (BAM) 330 can be capable of calculating one or more brightness parameters relevant to the current video image. In one exemplary embodiment BAM 330 may calculate a single average value of the brightness of the entire video image and a relevant SAD value that may be calculated to reflect the diversities of the brightness to give statistical information about the brightness of the image. In an embodiment in which BSM 320 is adapted to divide a video frame into two or more segments or zones, BAM 330 can be adapted to calculate an average value of the brightness and its associated SAD value per each one of the segments.

In other exemplary embodiment of the present invention, BAM 330 can be adapted to calculate another statistical parameter instead of or in addition to the average brightness value. For example, BAM can be adapted to calculate a brightness histogram of a current video image. In such an embodiment, the brightness range (for example 0-255) can be divided to several levels (for example: 10 levels, 20 levels etc.). BAM 330 can be adapted to divide the pixels into groups according to their brightness value and to count the number of pixels with brightness values falling into each bin to create the brightness histogram of the image. Alternatively, BSM 320 can be adapted to divide the frame into two or more segments or zones and calculate a histogram for each zone.

After receiving all the brightness values of the entire video image and calculating the brightness parameters that are relevant to the current video image, BAM 330 can send the one or more brightness parameters via CMM 310 to the brightness central controller BCC 242 in FIG. 2. More information about the operation of BSAM 300 is disclosed below in conjunction with FIG. 7.

Figure 4:
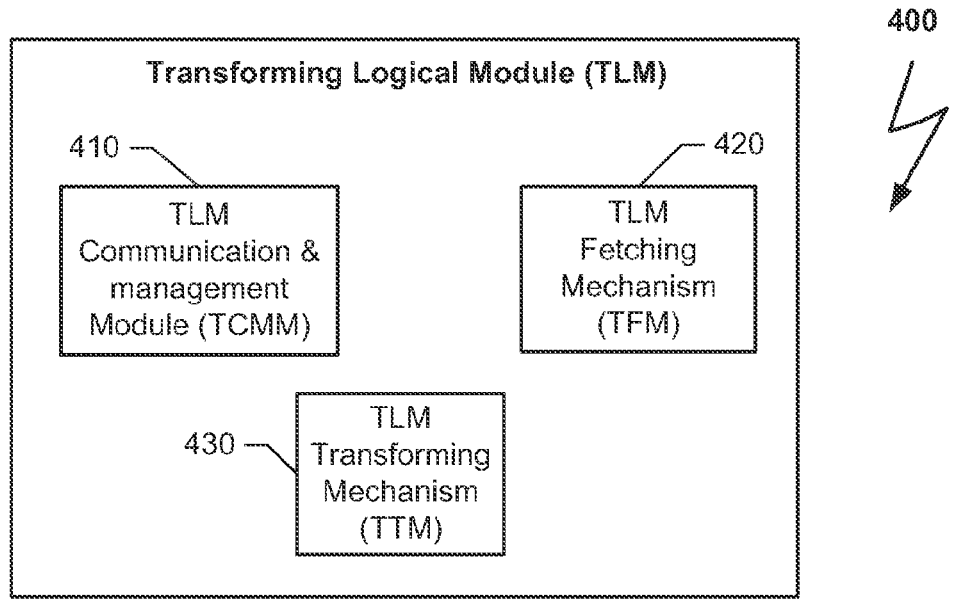
FIG. 4 is a block diagram illustrating elements of an exemplary Transforming Logical Module (TLM)

FIG. 4 is a block diagram illustrating elements of an exemplary transforming logical module (TLM) 400. In a centralized architecture, an exemplary TLM 400 may be embedded within an output module 255*a-c*. In such an embodiment the TLM 257 may manipulate the brightness value of the editor's frame memory before it is encoded by the encoder 258 (FIG. 2). Alternatively TLM 400 may be embedded within an input module 251*a-c*, for example, between BSAM 253 and common interface 254 (FIG. 2) where it can manipulate or transform the brightness level of each pixel in a video image before it is transferred toward output modules 255*a-c* via the common interface 254.

In a decentralized architecture TLM 400 can be embedded within an endpoint and manipulate the brightness value of a frame memory of the decoder endpoint before it is transferred to the display of the endpoint, for example.

An exemplary TLM 400 can be capable of transforming brightness level of each pixel in a video image in order to match the brightness perception of the other video images generated by the other endpoints. Exemplary TLM may receive a brightness transformation function, which is relevant to each of the video images transferred via TLM 400. TLM 400 may execute the function on the brightness value of each pixel of the video image. The brightness transformation function can be calculated and sent by BCC 242 (FIG. 2). An exemplary brightness transformation function can add or subtract a certain value from the brightness value of each pixel. Other embodiment may execute a linear transformation on each brightness value. Alternatively, a histogram equalization manipulation can be implemented on the brightness values of a frame. In some embodiments of TLM 400 the brightness transformation function can depend on the location of a pixel in the frame. In other embodiments the brightness transformation function can depend on the level of brightness of a pixel. Other embodiments of TLM 400 may use a combination of any of the above methods.

An exemplary TLM 400 may comprise a TLM communication and management module (TCMM) 410, a TLM fetching mechanism (TFM) 420 and a TLM transformed mechanism (TTM) 430. TCMM 410 can be a communication module for communicating with BCC 242 (FIG. 2) to receive one or more brightness transformation functions relevant to one or more endpoints that will be manipulated by TLM 400. For a TLM 400, which is located in the MCU, the communication with BCC 242 can be over control bus 244 (FIG. 2). For a TLM 400 located in an endpoint, the communication with BCC 242 can be in band or out of band. In such a distributed architecture the communication between TCMM 410 and BCC 242 can be similar to the communication described above in conjunction with FIG. 3 as the communication between the CMM 310 and BCC 242, for example.

Since the brightness of images in a videoconference typically change slowly one or more brightness transformation functions can be received periodically, for example every few minutes. A new set of brightness transformation functions can be calculated every few tens of seconds to 10 minutes, for example. In parallel, in between periods, if a layout is changed or if a speaker has changed, then the set of brightness transformation functions of the selected images may be updated and sent to the relevant TCMM 410 to match the change.

An exemplary TFM 420 can be implemented as a read/write controller of a frame memory. Such a TFM 420 can be adapted to fetch brightness component of the next image. The component of the entire frame can be fetched as one entity. Alternatively, a frame can be divided by TFM 420 into zones or segments, and the brightness of each zone can be fetched separately. To fetch the brightness component the TFM 420 can be adapted to get the addresses, in a next frame memory, of the brightness component. In some embodiments TFM 420 can be adapted to divide the addresses of the brightness component to two or more zones. TFM 420 can be further adapted to retrieve the brightness value of each of the pixels. The retrieved value is transferred to TTM 430 to be manipulated according to the relevant brightness transformation functions. In the other direction TFM 420 can be adapted to get the manipulated value of a pixel and store it in the same location in the next frame memory or at a relevant location in a new frame memory.

In one exemplary embodiment TFM 420 can be implemented as a switch (a router) located on the output of a next frame memory and adapted to identify that the current value belongs to a brightness component, to route the brightness value to TTM 430, and to send the manipulated value toward the destination of the original brightness value.

TTM 430 is capable of receiving brightness values of each of the pixels of the frame from TFM 420, executing the relevant brightness transformation function on the brightness values, and transferring the manipulated brightness values to TFM 420. Various types of transformations can be used. For example, the transformation can add a negative or positive offset value to change the average of the brightness of the image. Alternatively, two or more offset values (one per each segment or zone of the frame) may be used. In such embodiments, each segment or each zone of the frame can be manipulated differently to match the brightness of other video images.

In embodiments using a histogram, a brightness transformation function may include a plurality of offset values, each associated with a brightness range. TTM 430 can use such offset values to change the brightness histogram of the image to match a desirable brightness histogram. Other exemplary embodiments in which two or more zones are used, two or more brightness histograms can be used (one for each zone). Alternatively, histogram equalization algorithm can be used.

TTM 430 can be implemented by an arithmetic module that performs the brightness transformation function on the brightness value of each pixel. Alternatively, TTM 430 can be implemented by a LUT. The data in each address of the LUT can be the result of manipulating the brightness transformation function on the value of the address. In such embodiments, BCC 242 may calculate the new values and transfer the new brightness values to be written in the LUT of TTM 430 of each one to the relevant TLMs 400. In such embodiments the brightness values received from TFM 420 are used by TTM 430 as the address of the LUT and the data from the LUT is returned to TFM 420 as the manipulated data.

In a centralized architecture in which TLM 400 is embedded within an output module 255*a-c* or in a distributed architecture which TLM 400 is embedded within an endpoint, the TLM 400 can be capable of receiving brightness transformation function of each one the video images that compose a CP image to change or to manipulate the brightness value of each pixel of the video images to match them to a desirable level.

More information about the operation of TLM 400 is disclosed below in conjunction with FIG. 9.

FIG. 5 is a block diagram illustrating elements of brightness central controller (BCC) 500. BCC 500 may include a BCC communication and management module (BCM) 510, a brightness transforming parameters data base (BTPDB) 520, and a brightness transformation function mechanism (BTFM) 530. An exemplary BCC 500 can be located at control module 240 of an MCU 200 (FIG. 2). BCC 500 can manage the brightness matching mechanism.

An exemplary BCC 500 can be capable of controlling the brightness sampling periods of each conference conducted by the MCU, receiving the one or more brightness parameters from each of the BSAM 253 (FIG. 2), and calculating one or more Target Brightness Values for each conference. The target brightness value is the value that reflects a desirable brightness of a CP image. Therefore, the brightness of each video image is manipulated to match the set of one or more Target Brightness Values of the CP image or the set of one or more Target Brightness Values of the conference. BCC 500 is also capable of creating a set of brightness transformation functions for each TLM 257 (FIG. 2) involved in a conference.

BCC communication and management module 510 is a communication module for communicating with the plurality of BSAM 300 (FIG. 3) and with a plurality of TLM 400 (FIG. 4). In addition, BCC communication and management module 510 can be adapted to receive an indication that there is an event in the conference session that may require a sampling cycle. Exemplary events can be a change of one or more selected conferees, a change in a layout of an output module or a change in a layout of a conference, etc. In a centralized architecture, BCC communication and management module 510 may communicate with the plurality of BSAM 253 (FIG. 2) and the plurality of TLM 257 (FIG. 2) via the control bus 244. Alternatively, in a distributed architecture BCC communication and management module 510 may communicate with each BSAM and/or the TLM located at the endpoints via in band or out of band communication as described above in conjunction with the communication module 310 of BSAM 300 (FIG. 3).

In addition to its communication task, BCC communication and management module 510 may control the timing of the sampling period. When there is no event that requires a sampling cycle, the sampling period can be determined by a clock. When an event in the conference session occurs, such as a change of one or more selected conferees or a new conferee joins the session, the BCC communication and management module 510 may initiate a special sampling cycle to respond to a change in the brightness that may be created by the event.

The received set of one or more brightness parameters sent from each of the BSAM modules 253 at the end of a sampling cycle can be received by BCC communication and management module 510 and stored in a brightness transformation parameter data base 520. An index table can be used to manage the data base. After receiving the brightness parameters relevant to a certain conference, a command may be sent to the brightness transformation function mechanism (BTFM) 530 to calculate a set of one or more target brightness values associated with a certain conference and a set of one or more brightness transformation functions.

Difference type of brightness target value can be calculated by BTFM 530. For example in an embodiment in which a single brightness average value per each video image is used, a single target brightness value can be calculated for the conference and a single target brightness value can be the average value of the brightness averages of each of the video images created by the different endpoints. For each TLM an offset value can be calculated that reflects the difference between the received brightness parameter and the calculated target brightness value. In such embodiment the brightness transformation function created by BTFM 530 can add or subtract the value of the brightness of each pixel by the relevant offset value.

If a histogram is used as the brightness parameter, the received brightness histogram from each BSAM can be stored in the database. An exemplary brightness histogram can be expressed by a group of couples, each couple including the value of a brightness interval and the number of pixels belonging to the interval. In such an embodiment, the brightness transformation function mechanism (BTFM) 530 can calculate an offset value for each interval. The offset value can be adapted to normalize the distribution of the received histogram. The brightness transformation function can be expressed by a group of couples, each couple including a brightness interval value and a positive or negative offset value. At the appropriate TLM 400 (FIG. 4) each offset value can be added to the brightness value of pixels that fall into the relevant brightness interval. In other embodiments a histogram equalization algorithm can be used.

For embodiments in which frames are divided into a plurality of segments or zones, the target values and the brightness transformation function can be calculated per each zone in a similar way as for a frame.

BCC 500 can be adapted to inform a conferee that the brightness of its image differs from the brightness of the other conferees and to prompt the conferee to adjust the brightness of his image. Prompting the conferee can be done by adding a text data over the video image sent toward the relevant conferee. In such an embodiment a certain absolute difference between the Target Brightness Values and the conferee's brightness parameter received from the relevant BSAM module can be used as a threshold to activate the prompting message. More information about the operation of the brightness central controller 500 is disclosed below in conjunction with FIG. 8.

FIG. 6 is a block diagram illustrating relevant modules of an exemplary multimedia endpoint 600 adapted to utilize a decentralized architecture. Endpoint 600 is capable of executing one or more tasks to match the brightness of the different images received from different endpoints participating in a video conference. Endpoint 600 may include common multimedia endpoint modules such as but not limited to endpoint communication module (EPCM) 610, video encoder 620 having an encoder reference frame memory (ERFM) 625, and video decoder 640 having a decoder frame memory (DFM) 645. Endpoint 600 may further include an endpoint brightness sampling and analyzing module (EPBSAM) 630 and/or endpoint transformer logical module (EPTLM) 650.

Endpoint 600 may communicate with MCU 120 (FIG. 1) via network 110. The communication can be done according to multimedia communication protocol such as H.320, H.323, H.324, SIP, etc. EPCM 610 can be adapted to receive compressed media data and signaling and control data from the MCU; to process the received information according to the communication protocol; and deliver the media to the video decoder 640 or to the audio decoder (not illustrated in FIG. 6). Endpoint communication module 610 can receive compressed video from video encoder 620, process the compressed video according to the communication protocol, and deliver the compressed video toward the MCU via network 110 (FIG. 1). EPCM 610 can be capable of processing the communication transferred between the BCC 242 and EPTLM 650 and/or EPBSAM 630. The communication can be transmitted in band in the RTP packet as a part of a predefined header of the payload as disclosed above. Alternatively, the communication can be transmitted out of band over a dedicate connection such as an IP connection.

Video data from the camera is received and stored in the encoder frame memory 625. When a frame memory is full and ready, the video encoder 620 starts grabbing the video information pixel-by-pixel and encodes it according to the compression protocol. The video decoder receives the compressed video from the MCU, decodes the compressed video, and stores the decoded video in the decoder frame memory 645 from where the uncompressed video is sent to the display. A common video image in the decoder frame memory can be a composed image received from a plurality of endpoints currently selected by the MCU to be presented to the user of the endpoint 600.

In a decentralize architecture, if the endpoint 600 includes an endpoint BSAM 630, then the endpoint BSAM 630 is adapted to sample the brightness values of the reference video image of the encoder and calculate one or more brightness parameters of the reference video image. Endpoint BSAM 630 can be adapted to retrieve the brightness parameter from the encoder's reference frame memory 625. Endpoint BSAM 630 can begin a sampling cycle according to a command initiated and sent from BCC 242 in MCU 200 (FIG. 2). The command can be sent via the network interface module 220 of the MCU, network 110, and endpoint communication module 610. Endpoint BSAM 630 may operate in a similar way to BSAM 300 (FIG. 3) described above.

In an alternate embodiment of a decentralize architecture, endpoint 600 may include an endpoint TLM 650. The endpoint TLM 650 can be adapted to manipulate the brightness values of the video image received from the MCU and decoded by decoder 640. The manipulation can be done based on one or more brightness transformation functions received from BCC 242 (FIG. 2). The brightness transformation functions can be sent via the network interface module 220 of the MCU, network 110, and endpoint communication module 610. Endpoint TLM 650 can be adapted to switch the video data from the DFM 645 toward the endpoint TLM 650. From TLM 650, the manipulated video data is sent toward the display. Alternatively, endpoint TLM 650 can utilize a frame memory controller and can be adapted to retrieve the brightness component from the decoder frame memory 645 before it is sent to the display. The brightness component can be manipulated and the manipulated brightness values can be stored in the DFM 645. Endpoint TLM 650 may operate in a similar way to TLM 400 (FIG. 4) as described above. Yet an alternate embodiment of a decentralize architecture may have both an endpoint TLM 650 and an endpoint BSAM 630 as illustrated in FIG. 6.

FIG. 7 illustrates an exemplary task 700 with relevant steps implemented by BSAM 300 (FIG. 3), for example. Method 700 may be initiated upon power on reset and may run in a loop as long as the power is on. Alternatively method 700 can be initiated when a conference is started and can run in a loop as long as the conference is running. The loop can terminate when the video conference session is ended. After initiation, process 700 may wait 704 until receiving a command from BCC 242 (FIG. 2) to start a sampling cycle. Upon receiving 704 a command to start a sampling cycle, method 700 may collect information on the relevant frame memory 710. The relevant frame memory can be a decoder frame memory in case that the BSAM is associated with an input module of an MCU as BSAM 253 (FIG. 2), for example. Alternatively, with a distributed architecture the relevant BSAM can be located at the endpoint as illustrated for BSAM 630 (FIG. 6), wherein the frame memory can be the ERFM 625 (FIG. 6).

The collected information 710 on the frame memory can include the addresses of the brightness component in the frame memory. If an individual frames are divided into two or more zones, then in step 710 the addresses of each zone is collected. After collecting the information on the frame memory a loop, from step 720 to step 730, can be initiated. The loop can run over each addresses of the brightness component in the frame memory and retrieve 722 the brightness value of each pixel. Per each pixel, based on the retrieved brightness value of the current pixel, the calculated brightness parameter is adjusted 724. For example, if the brightness parameter is the average of the brightness of the frame, then at step 724 the current brightness value is added to the sum of the brightness value of the previous pixels and a counter of number of pixels is increased by one. At the end of this frame the calculated brightness parameter will be the sum of the brightness value of all the pixels in the frame. This sum can be divided by the number of pixels in the frame to calculate the average brightness.

After adapting the brightness parameter according to the brightness value of the current pixel, a decision is made 730 whether additional pixels exists in the frame memory. If yes, the loop continues and method 700 returns to step 720 and read the brightness value of the next pixel. If 730 the decision is that there are no additional pixels at the frame memory, then the brightness parameter is calculated 732 for example in case that the brightness parameter is an average value, then the sum of the brightness value of all the pixels is divided by the number of pixels.

Alternatively, if a brightness histogram is used, then at step 724 a counter associated with the brightness interval of the histogram that matches the brightness of the current pixel is increased by one to reflect the influence of the brightness of the current pixel on the histogram. In such an embodiment at step 732 the updated histogram is organized as a group of couples of numbers wherein in each couple a first number represents a brightness interval and a second number represents the number of pixels falling within that interval.

After calculating the current brightness parameter of the frame at step 740 a decision is made whether additional brightness parameters are needed. For example, in case that the frame is divided into two or more zones the decision can be whether there is a need to calculate the brightness parameter of the next zone. Alternatively an average value is used with additional statistical parameters such as SAD (sum of absolute difference). The SAD can be used for validating the value of the average. In such embodiments an additional brightness parameter is needed (i.e., the SAD value), then method 700 may proceed to step 742. In step 742 information of the frame memory relevant to the next brightness parameter can be collected. For calculating the SAD value, the same information on the frame memory collected at step 710 can be used and method 700 returns to step 720 for calculating the SAD value.

For the SAD loop, step 724 and step 732 can be adapted to calculate the SAD value. Step 724 can be modified to calculate the absolute difference between the brightness value of the current pixel and the average value that was calculated in step 732 during the previous loop. Then the calculated absolute difference of the current pixel is added to the sum of all the absolute differences of the previous pixels. Step 732 can be adapted to generate, at the end of the loop, the sum of the absolute differences of all the relevant pixels and divide it by the number of pixels which was used for calculating the average brightness of the frame.

In an alternate embodiment in which the frame is divided into zones, in step 740 a decision is made whether additional zones exist. If yes, then in step 742 method 700 may calculate the addresses in the frame memory that include brightness values of pixels belonging to the next zone. After getting the information that is relevant to the brightness component of the next zone, method 700 returns to loop 720 starting the loop such that the loop can run over the entire frame memory or it can run on a segment of the frame memory depending on the method used for calculating the brightness parameter.

If at step 740 it is determined that there is no need for additional brightness parameters, the one or more brightness parameters calculated and saved at step 732 can be sent 744 to BCC 242 (FIG. 2). At this point the sampling cycle is terminated and method 700 returns to step 704 waiting for the next sampling command.

FIG. 8 is a flowchart illustrating an exemplary process 800 of a brightness central controller. Process 800 can be implemented by BCC 242 (FIG. 2). Method 800 can be initiated 802 when a video conference is initiated and can run in a loop as long as the conference is running such that process 800 is terminated at the end of the conference. After initiation, a timer TS is reset 804. Timer TS defines the sampling period. The sampling period can be configured by an administrator of network 100 (FIG. 1). Exemplary values the sampling period can be at the range of few tens of seconds to few minutes, between 30 seconds to 10 minutes, for example.

After initiating the timer TS, a decision is made 806 whether a "change command" has been received. A "change command" can be received from the control module 240 when one or more selected conferees change, when a new speaker begins speaking, when a layout is changed, etc. If a "changed command" was not received, then the timer TS is compared 808 to the value of the sampling period T1. As described above, T1 can be in the range of few tens of seconds to few minutes, 30 seconds to 10 minutes for example.

If 808 TS is not equal to T1 method 800 may return to step 806 and check if a "changed command" was received. The loop 806 and 808 may continue until a command is received 806 or TS becomes equal to T1 808. Then method 800 proceeds to step 809 and sends a sampling command to BSAMs 300 (FIG. 3) associated with the current conference. After sending 809 the sampling command, method 800 may wait 810 until receiving the brightness parameters from the BSAMs 300 associated with the conference.

On receiving 812 the brightness parameters from the relevant BSAMs, method 800 may calculate one or more target brightness values for the conference. The target brightness value of the conference can be calculated in different methods. An exemplary method 800 can calculate a single average value of the brightness of a frame. The target brightness value of the conference can be the average of the brightness average values received in step 810 from the BSAMs associated with the conference.

Alternatively, if the frame is divided into two or more zones, then two or more target brightness values will be calculated for the conference, one target brightness value per each zone. Alternatively, if a brightness histogram is used as the brightness parameter then a target brightness value can be a histogram that is the average of the histograms received from the BSAM, for example. After calculating 812 the appropriate target brightness value, a loop can be initiated from step 820 to step 830.

Each cycle of the loop step 820 to step 830 can be associated with a transformer logical module (TLM) 400 (FIG. 4) associated with the conference. Per each transformer logical module associated with the conference, at step 822 the relevant one or more brightness parameters are retrieved. The relevant brightness parameters are the brightness parameters calculated for the conferee's video images that will be transformed by the appropriate TLM. For example, if the current TLM is embedded within an output module of an MCU, such as TLM 257 in FIG. 2 and for a layout of 4 images (2×2) of conferees A, B, C, D then the one or more relevant brightness parameters are the brightness parameters calculated by the BSAMs embedded within the four input modules associated with the endpoint of conferee A, the endpoint of conferee B, the endpoint of conferee C, and the endpoint of conferee D.

After collecting 822 the relevant one or more brightness parameters from the brightness transforming parameter data base 520 (FIG. 5), BCC 500 may begin calculating 824 the one or more brightness transformation functions, i.e., one or more brightness transformation functions per each segment of a conferee's video image in the editor's 256 (FIG. 2) frame memory. In the above example of a 2×2 layout, there are 4 segments each being associated with an endpoint. For example, the top left corner of the editor's frame memory can be associated with endpoint A, the top right can be associated with endpoint B, the bottom left corner can be associated with endpoint C, and the bottom right corner of the frame can be associated with endpoint D. In such layout, one or more brightness transformation functions can be calculated for each of the four segments.

If an average value is used, the brightness transformation function for each quarter can be the target brightness value of the conference minus the average brightness value of the image received from the relevant BSAM, for example, beginning with the BSAM associated with endpoint A. Then, the brightness transforming parameter of the top right corner associated with endpoint B can be calculated 824 as the difference between the target brightness value of the conference (which was calculated in step 812) minus the average brightness value of the image that was received from endpoint B and that was calculated by the BSAM that associated with the endpoint B and so on.

Alternatively, if a brightness histogram is used as the brightness parameter a histogram matching method can be used to adapt the histogram of each image from the top left, top right, bottom left and bottom right corners of the video frames to match the histogram to the target brightness histogram of the conference. Such an exemplary embodiment may calculate an offset value for each brightness interval of the histogram 824. The offset value is adapted to normalize the distribution of the received histogram. In such embodiment the brightness transformation function can be expressed by a group of couples, each couple including a brightness interval value and a positive or negative offset value. In an alternate exemplary embodiment, a histogram equalization algorithm can be implemented.

After calculating the transformation functions relevant to the current TLM, method 800 may send 826 the one or more brightness transformation functions via the BCC communication module 510 (FIG. 5) to the relevant TLM. Then 830 a decision is made whether there are additional TLMs that need to receive a set of updated brightness transformation functions. If yes, method 800 returns to step 820 and returns the loop for the next TLM. If 830 not, method may return to step 804 initiates timer TS and start the loop again.

FIG. 9 illustrates a flowchart with relevant steps of an exemplary transforming logical module process 900. Such an exemplary process can run on each of the TLM modules 500 (FIG. 5) associated with the conference. After initiation 902 method 900 can wait 904 until receiving a set of brightness transformation functions relevant to the TLM executing this process. Upon receiving the brightness transformation functions, the brightness transformation functions are saved 906 and method 900 can begin transforming the brightness of the next frame memory.

After saving the brightness transformation functions, information on the next frame memory is retrieved 908. The information can include the addresses of the brightness component. The information on the frame memory may include addresses according to the segments relevant for the TLM, for example, if the TLM is associated with an output module of an MCU such as TLM 257 (FIG. 2) and its associated output module 255 creates a layout 2×2 of four images. The first image, at the top left corner of the frame can be the image created by endpoint A; the image at the top right corner can be created by endpoint B; the image at the bottom left can be created by endpoint C; and the image at the right bottom corner can be created by endpoint D. In such case, the frame memory parameter may include the addresses of the brightness components relevant for each segment.

After getting 908 the information on the frame memory, method 900 can start a loop between step 920 and 930. The loop can run on each one of the pixels that belongs to a certain segment. In the case that method 900 starts with the top left corner, the first loop will run on each of the pixels of the top left segment of the frame. Per each pixel 920 in the top left segment, the brightness value of the pixel is retrieved 922 from the frame memory. The brightness value is manipulated 924 according to the set of brightness transformation functions relevant to that segment.

Different methods can be used for manipulating (transforming) 924 the brightness value. If an average value is used as the brightness parameter an offset value reflecting the difference between the averages of the brightness parameters of the video image received from endpoint A compared to the brightness target value of the conference. Then the offset value can be added to each brightness value of each pixel of the segment associated with endpoint A.

Alternatively, if a brightness histogram is used, the brightness transformation step 924 can be expressed by a group of couples, each couple including a brightness interval value and a positive or negative offset value. During the manipulating step 924, the brightness interval relevant to the brightness of the pixel is searched and the offset value associated with this interval can be added to the brightness value of the pixel. In other embodiments a histogram equalization process can be used in step 924.

After manipulating 924 the brightness value, the new brightness value can be stored 926 in the same address in the frame memory. A decision is made 930 whether additional pixels exists in the same segments. If yes 930 method 900 returns to step 920 for manipulating the brightness value of the next pixel. If there is no additional pixel at the segments then a decision is made at step 940 whether additional segments exist. If no, which means the current segment is the last one or the only one, then a decision is made at step 944 whether a new set of brightness transformation functions was received from BCC 242 (FIG. 2). If 944 no, method 900 may return to step 908 and start transforming the brightness of the following next frame memory. If 944 yes, an indication that a new set of brightness transformation functions was received, then method 900 may return to step 906 and save the new set of brightness transformation functions and start the loop again.

Returning now to step 940, if additional segments exists, then method 900 returns to step 908 to get the location of the next segment of the frame memory and get the parameter of the address of the brightness component of the next segment. After collecting the information the loop between steps 920-930 is initiated again per each of the pixels that belong to the next segment. Method 900 may continue until transforming the entire frame memory.

Structural details for practicing the disclosed methods and systems will be apparent to one of skill in the art given the description and drawings. Other combinations of logical module disclosed herein and/or known in the art may be implemented. In the present disclosure, the words "unit," "element," "module" and "logical module" may be used interchangeably. Anything designated as a unit or module may be a stand-alone unit or a specialized or integrated module. A unit or a module may be modular or have modular aspects allowing it to be easily removed and replaced with another similar unit or module. Each unit or module may be any one of, or any combination of, software, hardware, and/or firmware.

It will be appreciated that the above described apparatus, systems and methods may be varied in many ways, including, changing the order of steps, and the exact implementation used. The described embodiments include different features, not all of which are required in all embodiments of the present disclosure. Combination of the disclosed sampling methods, algorithms, and correction methods can be implemented in the same embodiment. Moreover, some embodiments of the present disclosure use only some of the features or possible combinations of the features. Different combinations of features noted in the described embodiments will occur to a person skilled in the art. Furthermore, some embodiments of the present disclosure can be implemented by combination of features and elements that have been described in association to different exemplary embodiments along the discloser. The scope of the invention is limited only by the following claims.

What is claimed is:

1. A method for controlling the appearance of video frames displayed during a multipoint videoconference, comprising:
receiving a plurality of video streams from a plurality of endpoints;
determining an appearance parameter for a video frame transmitted over a video stream of the plurality of video streams; and
transforming the appearance parameter of the video frame based on a target appearance value for displaying the video frame in a videoconferencing layout.

2. The method of claim 1, wherein the appearance parameter is a brightness parameter.

3. The method of claim 1, wherein the appearance parameter is a hue parameter.

4. The method of claim 1, wherein the appearance parameter is a sharpness parameter.

5. The method of claim 1, wherein the target appearance value is based on appearance parameters of video frames received from each of the endpoints to be included in the videoconferencing layout.

6. The method of claim 1, wherein determining an appearance parameter comprises:
averaging an appearance value of each decoded video frame in the video stream.

7. A method for controlling the appearance of video frames displayed during a multipoint videoconference, comprising:
generating a video stream;
determining an appearance parameter of the video stream;
transmitting the appearance parameter to a central controller;
transforming the video stream with a transformation function received from the central controller, wherein the transformation function transforms the appearance parameter to a target appearance parameter; and outputting the transformed video stream.

8. A method for controlling the appearance of video frames displayed during a multipoint videoconference, comprising:

generating a transformation function for transforming a video stream based on a first appearance parameter corresponding to a video stream of a first endpoint and a target appearance parameter, wherein the target appearance parameter is determined from appearance parameters received from a plurality of endpoints, wherein a videoconferencing layout comprises a layout of transformed video streams from the plurality of endpoints.

9. The method of claim 8, further comprising receiving the first appearance parameter for a video stream from the first endpoint.

10. The method of claim 8, further comprising:

determining the first appearance parameter by analyzing the video stream received from the first endpoint.

11. The method of claim 8, further comprising:

transmitting the transformation function to the first endpoint.

12. An apparatus comprising:

a plurality of input modules, each configured to receive a video stream; and decode compressed video images transmitted over the video stream;

a plurality of appearance parameter modules, each associated with one of the plurality of input modules and configured to determine an appearance parameter corresponding to decoded video images; and generate a target appearance value for displaying the video images-in a videoconferencing layout;

a controller adapted to create a transformation function for each of the plurality of input modules based on a difference between the target appearance value and the appearance parameter of the corresponding input module;

a transforming module, adapted to transform the decoded video images of an input module of the plurality of input modules according to the corresponding transformation function, generating a transformed video stream; and an output module, adapted to generate a conference continuous presence video image-from two or more transformed video streams.

13. The apparatus of claim 12, wherein the target appearance value is based on appearance parameters of video images decoded by each of the plurality of input modules associated with the continuous presence video image.

14. The apparatus of claim 12, wherein the appearance parameter is a hue parameter.

15. The apparatus of claim 12, wherein the appearance parameter is a sharpness parameter.

16. The apparatus of claim 12, wherein the appearance parameter is determined from an average appearance value of each video image decoded by the corresponding input module.

17. The apparatus of claim 12, wherein the transformation function adds an offset value to the appearance parameter, the offset value based on the difference between the target appearance value and the appearance parameter.

18. The apparatus of claim 12, wherein the apparatus is a multipoint control unit.

19. A decentralized videoconferencing system, comprising:

a plurality of endpoints, each comprising:

an appearance parameter module, configured to determine an appearance parameter of a video stream; and a control unit, comprising:

a controller adapted to create a transformation function for a video stream received from an endpoint of the plurality of endpoints for use in transforming the appearance parameter of the video stream to a target appearance value.

20. The decentralized videoconferencing system of claim 19, wherein the control unit further comprises:

a transforming module configured to apply the transformation function to the video stream, generating a transformed video stream.

21. The decentralized videoconferencing system of claim 19, wherein each of the plurality of endpoints further comprises:

a transforming module configured to apply the transformation function to the video stream, generating a transformed video stream.

22. The decentralized videoconferencing system of claim 19, wherein each of the plurality of endpoints transmits the appearance parameter to the controller out-of-band.

* * * * *